United States Patent
MacLeod

(10) Patent No.: US 7,817,754 B2
(45) Date of Patent: *Oct. 19, 2010

(54) M-ALGORITHM WITH PRIORITIZED USER ORDERING

(75) Inventor: Robert B. MacLeod, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1003 days.

This patent is subject to a terminal disclaimer.

(21) Appl. No.: 11/292,233

(22) Filed: Dec. 1, 2005

(65) Prior Publication Data

US 2006/0115026 A1 Jun. 1, 2006

Related U.S. Application Data

(60) Provisional application No. 60/632,108, filed on Dec. 1, 2004, provisional application No. 60/632,109, filed on Dec. 1, 2004.

(51) Int. Cl.
*H03D 1/00* (2006.01)
*H03K 9/00* (2006.01)
*H04L 27/00* (2006.01)

(52) U.S. Cl. .............. 375/343; 375/316; 375/340; 370/320; 370/335; 370/342; 370/441; 370/479; 370/515; 708/300; 708/314; 708/422; 708/426

(58) Field of Classification Search .............. None
See application file for complete search history.

(56) References Cited

U.S. PATENT DOCUMENTS

| | | | |
|---|---|---|---|
| 6,171,256 B1 * | 1/2001 | Joo et al. ............... | 600/508 |
| 6,618,433 B1 * | 9/2003 | Yellin ................ | 375/148 |
| 6,704,376 B2 | 3/2004 | Mills et al. | |
| 6,831,574 B1 | 12/2004 | Mills et al. | |
| 6,947,505 B2 | 9/2005 | Learned | |
| 6,947,506 B2 | 9/2005 | Mills | |
| 2002/0037061 A1 * | 3/2002 | Learned ............... | 375/346 |
| 2002/0085623 A1 * | 7/2002 | Madkour et al. ......... | 375/148 |
| 2002/0159415 A1 * | 10/2002 | Pan et al. ............. | 370/335 |
| 2003/0138035 A1 | 7/2003 | Mills | |
| 2003/0138065 A1 * | 7/2003 | Mills et al. ........... | 375/346 |
| 2003/0198305 A1 | 10/2003 | Taylor et al. | |
| 2003/0204808 A1 | 10/2003 | Mills | |
| 2004/0123227 A1 * | 6/2004 | Lee et al. ............. | 714/792 |
| 2004/0136313 A1 * | 7/2004 | Goldstein et al. ....... | 370/203 |
| 2004/0152423 A1 * | 8/2004 | Reznik ............... | 455/67.11 |
| 2004/0213360 A1 * | 10/2004 | McElwain .............. | 375/340 |
| 2004/0259504 A1 * | 12/2004 | Onggosanusi et al. .... | 455/67.13 |
| 2007/0036250 A1 * | 2/2007 | Niedzwiecki ........... | 375/348 |

* cited by examiner

*Primary Examiner*—Shuwang Liu
*Assistant Examiner*—Gina McKie
(74) *Attorney, Agent, or Firm*—Vern Maine & Associates

(57) ABSTRACT

Performing approximate diagonalization of a correlation metric by user permutation to improve Multiuser Detector (MUD) processing. The system reorders the entries in the S-Matrix in order to move the bit decisions closer together in the decision tree. In one embodiment the reordering is a sequential pairwise correlation.

20 Claims, 5 Drawing Sheets

M-ALGORITHM WITH PRIORITIZED USER ORDERING

RELATED APPLICATIONS

This application claims the benefit of U.S. Provisional Applications No. 60/632,108, filed Dec. 1, 2004, and No. 60/632,109, filed Dec. 1, 2004 which is herein incorporated in its entirety by reference.

FIELD OF THE INVENTION

The invention relates to receiver processing and more particularly to improved processing using multiuser detection.

BACKGROUND OF THE INVENTION

A receiver is broadly defined as a device that receives incoming signals and decodes the signals to extract information. Receiver processing is commonly utilized for multiple access communications systems such as wireless Local Area Networks, cellular land-mobile communications systems, mobile satellite communications systems, and memory storage and retrieval devices.

Within the telecommunications industry the wireless growth has been phenomenal. The proliferation of devices and the expansive content of the wireless sector equate to more and more data being transmitted. There are several known wireless systems including Code Division Multiple Access (CDMA), Frequency Division Multiple Access (FDMA) and Time Division Multiple Access (TDMA) to achieve channel access.

One of the goals of FDMA and TDMA systems is to try and prevent two potentially interfering signals from occupying the same frequency at the same time. In contrast, Code Division Multiple Access (CDMA) techniques allow signals to overlap in both time and frequency. In a CDMA system, each signal is transmitted using spread spectrum techniques wherein CDMA signals share the same frequency spectrum and in the frequency or time domain, the CDMA signals appear to overlap one another.

Despite the advancements in wireless transmission and reception, there are still problems with such wireless channels including the ability to process multiple users in a given bandwidth. For example, a base station that processes a number of cellular devices has to receive and transmit data within a certain frequency range. The ability to extract the correct data from a given user is a difficult task, especially when the effects of interference and multipaths are considered. The problem is further complicated when the number of users exceeds the number of dimensions, resulting in an overloaded condition.

As an example of one embodiment, a plurality of spread information signals, such as binary phase shift keying (BPSK) or quadrature phase shift keying (QPSK) modulation, modulate a radio frequency (RF) carrier and are jointly received as a composite signal at the receiver. Each of the spread signals overlaps all of the other spread signals, as well as noise-related signals, in both frequency and time. The receiver correlates the composite signal with one of the unique signature sequences, and the corresponding information signal is isolated and despread.

A signature sequence is normally used to represent one bit of information. Receiving the transmitted sequence or its complement indicates whether the information bit is a +1 or −1, sometimes denoted "0" or "1". The signature sequence usually comprises N pulses, and each pulse is called a "chip". The entire N-chip sequence, or its complement, depending on the information bit to be conveyed, is referred to as a transmitted symbol.

The receiver correlates the received signal with the complex conjugate of the known signature sequence to produce a correlation value. When a 'large' positive correlation results, a "0" is detected, and when a 'large' negative correlation results, a "1" is detected.

It should be understood that the information bits could also be coded bits, where the code is a block or convolutional code. Also, the signature sequence can be much longer than a single transmitted symbol, in which case a subsequence of the signature sequence is used to spread the information bit.

There are a host of approaches for jointly demodulating any set of interfering digitally modulated signals, including multiple digitally modulated signals. In a real world multiuser system, there are a number of independent users simultaneously transmitting signals. These transmissions have the real-time problems of multi-path and co-channel interference, fading, and dispersion that affect the received signals. As described in the art, multiple user systems communicate on the same frequency and at the same time by utilizing parameter and channel estimates that are processed by a multi-user detector. The output of the multi-user detector is an accurate estimation as to the individual bits for an individual user.

There are systems which describe multiple users that can transmit coded information on the same frequency at the same time, with the multi-user detection system separating the scrambled result into interference-free voice or data streams. Emerging receiver processing procedures allow for huge increases in the utilization of multiple access communications. The common problem is that the processing procedures in the receivers are difficult to run in real time. Advanced receiver techniques cover several areas, namely interference suppression (sometime called multi-user detection), multipath combining and space-time processing, equalization, and channel estimation. These various techniques can be mixed and matched depending upon the circumstances. Proper signal processing of transmitter and receiver yield a far greater potential than current systems.

Multi-user detection (MUD) refers to the detection of data in non-orthogonal multiplexes. MUD processing increases the number of bits available per chip or signaling dimension for systems having interference limited systems. A MUD receiver jointly demodulates co-channel interfering digital signals.

Optimal MUD based on the maximum likelihood sequence estimator operates by comparing the received signal with the entire number of possibilities that could have resulted, one for each bit or symbol epoch. Unfortunately, this processing is a computationally complex operation and it is not possible to accomplish in a real-time environment. Thus for those multiuser detectors that examine the entire space, real-time operation is often elusive.

In general, optimal MUD units function by examining a number of possibilities for each bit. However, for multi-user detectors that examine a larger capacity of signal, the computations are complex and time-consuming, thus making real-time operation impossible. Numerous attempts at reliable pruning of the optimal MUD decision process or the use of linear approximation to the replace the optimal MUD have still not produced a workable solution for the real world environment.

There are various multiuser detectors in the prior art, including optimal or maximum likelihood MUD, maximum likelihood sequence estimator for multiple interfering users, successive interference cancellation, TurboMUD or iterative MUD, and various linear algebra based multi-user detectors such as all of those detailed in the well-known text "Multiuser Detection" by Sergio Verdu. In basic terms, turbodecoding refers to breaking a large processing process into smaller pieces and performing iterative processing on the smaller pieces until the larger processing is completed. This basic principle was applied to the MUD.

There are known problems in these prior MUD designs. Linear Algebra based MUD (non-iterative) and successive interference cancellation fails for cases of overloaded multiple access systems. One example of overloading is where the number of simultaneous users is doubled relative to existing state of the art. Even for under-loaded multiple access systems, the performance of non-iterative MUD and successive interference cancellation degrades significantly as the number of users increases, while the computation complexity of the optimal MUD increases significantly as the number of users increases. More expensive and sophisticated processing is needed and there is an unreasonable processing delay required to decode each bit or symbol.

Reduced complexity approaches based on tree-pruning help to some extent to prune the proper path in the decision tree. The M-algorithm is a pruning process that limits the number of hypotheses extended to each stage to a fixed tree width and prunes based on ranking metrics for all hypotheses and retaining only the M most likely hypotheses. The T-algorithm prunes hypotheses by comparing the metrics representing all active hypotheses to a threshold based on the metric corresponding to the most-likely candidate. Performance of M-algorithm based MUD degrades as the parameter M is decreased, but M governs the number of computations required. Similar effects are seen for other tree-pruning based MUD, such as the T-algorithm. To combat improper pruning, basic tree-pruning must ensure that M is "large enough", and therefore still encounters increased complexity for acceptable performance levels when the number of interfering signals and/or ISI lengths are moderate to large.

As an illustration of the M-algorithm as a tree-pruning algorithm, consider a tree made up of nodes and branches. Each branch has a weight or metric, and a complete path is a sequence of nodes connected by branches between the root of the tree and its branches. When applied as a short cut to the optimal MUD, each branch weight is a function of the signature signal of a certain transmitter, the possible bit or symbol value associated with that transmitter at that point in time, and the actual received signal which includes all the signals from all the interfering transmissions. The weight of each path is the sum of the branch metrics in a complete path. The goal of a tree searching algorithm is to try to find the complete path through a tree with the lowest metric. With the present invention the metrics of multiple complete paths are not calculated. Rather, the metrics of individual branches in a tree are calculated in the process of locating one complete path through the tree and thereby defines one unknown characteristic of each of the co-channel, interfering signals needed to decode the signals.

A MUD algorithm within the TurboMUD system determines discrete estimates of the transmitted channel symbols, with the estimates then provided to a bank of single-user decoders (one decoder for each user) to recover the input bit streams of all transmitted signals.

Two general types of multi-user detectors within the TurboMUD system are possible, namely those that provide hard outputs, which are discrete values, and those that provide soft outputs, which indicate both the discrete estimate and the probability that the estimate is correct.

However, single-user decoders operating on hard values, or discrete integers, have unacceptable error rates when there is a large amount of interference. The reason is that discrete integers do not provide adequate confidence values on which the single-user decoder can operate. These decoders operate better on so-called soft inputs in which confidence values can range from −1 to 1, such as for instance 0.75 as opposed to being either −1 or +1.

In an attempt to provide soft values that can then be utilized by a single-user decoder, the multi-user detector can generate these soft values. However the processing takes an inordinate amount of time. As a result, these systems do not produce real-time results. Since single-user decoders operate best on soft values, it is often times the case that the computational complexity for a robust MUD capable of generating these soft values makes it impossible to get a real-time result.

In an attempt to provide real-time performance by reducing the computational complexity of an iterative multi-user detector that can produce soft values, certain algorithms have been described for examining less than the total number of possibilities for each of the bits of data that are coming in from the multiple users. The "shortcuts" taken by this reduced complexity approach causes some errors, and combating these errors by increasing the number of iterations of the system tends to nullify any advantage.

Thus, while the MUD unit can generate soft values within the iterative cycle of the TurboMUD, the entire detection system is slowed down in generating these soft values. It should be appreciated that these soft values, rather than being integers which would be considered to be hard values, are real numbers, which in effect, permit a single user decoder to better error correct the output of the multi-user detector and thereby provide a more robust bit stream that will faithfully represent the original input for a given user.

Moreover, when dealing with hand-held communications units such as wireless handsets, the amount of processing within the device is limited, directly limiting the amount of computational complexity that is allowed. In order to provide real-time performance both at a cell site and the handset, it therefore becomes important to be able to reduce the amount of computational complexity and processing time so as to achieve real-time performance.

Existing approaches fail to address all of the aforementioned problems. What is needed is an efficient signal processing technique to improve the quality and spectral efficiency of wireless communications and better techniques for sharing the limited bandwidth among different high capacity users. As can be seen, attempts to make real-time processing multi-user processing have been frustrated by complex and sophisticated hardware and processing requirements. What is needed therefore is a method and apparatus for allowing multiple users to operate in the same channel. Such a system should provide accurate cancellation of interfering signals while reducing complex processing.

SUMMARY OF THE INVENTION

The present invention according to one embodiment is a method to improve MUD computation and to reduce the number of computations necessary to meet a fixed design point. According to one embodiment, this is accomplished by approximate diagonalization of the correlation metric by user permutation.

The M-algorithm is a multi-user detector (MUD) to take a stream of data as input and outputs a stream of bit decisions for every user. For MUD to work it takes the data stream in and uses additional information about the users, such as from the parameter estimator, to help the MUD to separate the users. The present invention is based upon an understanding that MUD works differently depending upon how the users are ordered.

According to one embodiment of the present invention, the system reorders the entries in the S-Matrix in order to move the bit decisions closer together in the decision tree.

Other systems deal with perturbing amplitudes and phases of users for reordering, however the present invention is not a technique to manipulate the transmissions to make MUD work better. The present invention deals with taking the received information and arranging with ordering of users in the S matrix. Another embodiment of the present invention provides a system that reduces the size of the M-algorithm tree by forcing joint bit decisions to be made only where necessary.

There are certain known disadvantages of using algorithms such as the M-algorithm. For example, unstable or overly-complex/time-consuming processing may result from poor ordering of users or bit decisions. The size of the decision tree needed for certain situations may become unnecessarily large when two interfering bit decisions occupy positions in the tree which are separated. Thus, the approximate diagonalization described herein reduces the computation complexity of the M-algorithm.

One embodiment of the invention is a system for reordering users of a multiuser detector, comprising processing an incoming data stream to form an initial S-Matrix of K users, re-ordering the S-Matrix starting from a random column and forming a permuted S-Matrix array correlated from the random column, processing the permuted S-Matrix Array in the multiuser detector and outputting an array of bit decisions.

The system is intended to provide approximate diagonalization. Further aspects include wherein the permuted S-Matrix array is a sequential pairwise correlation from each of a previous correlated column. The multiuser detector can be an M-algorithm. The system can further comprise performing Cholesky factorization of the initial S-Matrix. Also, the system can perform a refinement of the permuted S-Matrix array to confirm correlation.

Another embodiment of the invention includes the system wherein the permuted S-Matrix array is processed in a windowed multiuser detector. The S-Matrix may be reordered prior to being processed in the windowed multiuser detector.

One embodiment of the present invention is a method for performing approximate diagonalization of an S-Matrix of vector data arranged in a plurality of columns, comprising selecting an initial column of data from the S-Matrix array, removing the initial column from the S-Matrix array thereby forming a remaining S-Matrix array, forming a permuted S-Matrix array starting with the initial column. The forming of the permuted S-Matrix array comprises, from the remaining S-Matrix Array, correlating a sequential column, removing the sequential column from the remaining S-Matrix Array, adding the sequential column to the permuted S-Matrix Array, and repeating the correlating, removing and adding for the remaining S-Matrix array thereby performing the approximate diagonalization.

The method may further include further aspects such as, wherein the initial column of data is a randomly selected column of data. The correlating can be a pairwise correlation to the sequential column. The forming of the S-Matrix Array can be from a subsection of a larger S-Matrix Array. In some cases, this may entail re-ordering of the larger S-Matrix Array prior to forming the S-Matrix Array. A further step includes confirming the approximate diagonalization. The confirming may comprise swapping each of the columns of data, determining if correlation is improved by the swapping, and replacing any of the columns that provide improved correlation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is further described with reference to the accompanying drawings wherein.

DETAILED DESCRIPTION

The methods and embodiments of the re-ordered MUD disclosed herein enable implementations of low complexity advanced receiver processing providing high quality real-time processing for multiple access systems operating.

The described embodiments are just an illustration of the digital processing technique that is applicable to the many variations and applications all within the scope of the invention. A description of multiuser processing for various embodiments is detailed in the commonly assigned patents and patent applications including U.S. Pat. No. 6,947,506 titled Method and Apparatus for Improved Turbo Multiuser Detector; U.S. Pat. No. 6,831,574 titled Multi-Turbo Multi-User Detector; and U.S. Pat. No. 6,704,376 titled Power and Confidence Ordered Low Complexity Soft TurboMUD with Voting System; U.S. Published Patent No. 2003/0204808 titled Method and Apparatus for Random Shuffled Turbo Multiuser Detector; and 2003/0138035 titled Voting System for Improving the Performance of Single-User Decoders within an Iterative Multi-User Detection System; all of which are incorporated herein by reference for all purposes.

While the discussion herein illustrates wireless communications, the multiple access topology is equally applicable to wired cable systems and local area networks, read/write operations of a disc drive, satellite communications and any application that benefits from processing of digital data from among many multiple sources. The use of the term 'users' is therefore utilized as a convention to describe processing among a plurality of signal sources.

Figure 1:
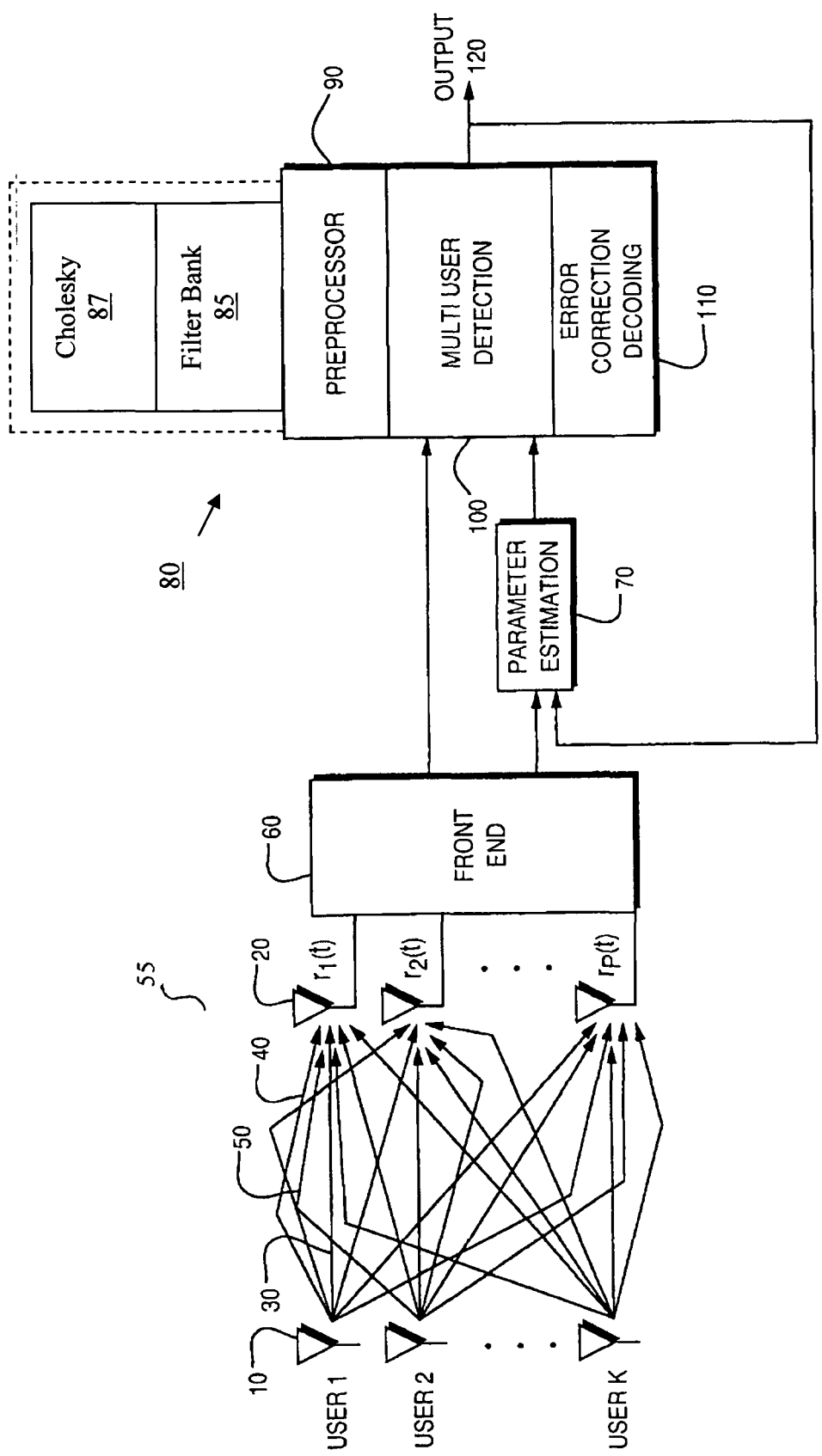
FIG. 1 is an illustration of a multi-user environment and subsequent processing in a Multi-User Detector for a wireless communications embodiment.

Referring to FIG. 1, representing one embodiment, a number of users (1-K) generate signals that are sent by transmitters 10 into free space. There is normally a noise component 55 that is introduced from the environment of a random nature in the received signal. While any noise 55 that has a repeatable or non-random nature can be eliminated or minimized through processing, random noise elements are reduced in other manners. The signals are received ay antennas 20 and represent directly received signals 30, as well as multi-path signals 40 from the same user, and interfering signals 50 from other users.

The plurality of signals from the antennas 20 is processed in a front end unit 60. The front end unit 60 downconverts the higher frequency signals into baseband signals for ease of processing. The baseband signals are digitized by analog to digital converters (A/D). The front end 60 cooperates with the parameter estimation unit 70 to retrieve needed information for the signals such as relative received timing offsets, carrier phase, frequency offsets, received amplitudes, and multipath structure for each of the interfering signals present in the received signal. A further description of parameter estimation is provided by U.S. Pat. No. 6,947,505, which is commonly assigned and incorporated herein by reference.

The incoming data to the MUD is typically streams of data, wherein each stream corresponds to a different user. Any one stream may be from multiple CDMA cell phones which are operating on the same frequency and transmitting at the same time, and which produce interfering signals. A stream may also be from a number of cable boxes communicating with a head end system on the same frequency and at the same time. Alternatively, a stream may be from multiple users of an 802.11 wireless local area network or an ultra wideband network. Alternatively, a stream may be interfering signals from adjacent tracks on a digital storage disk in which the read head is overlapping one or more of the highly dense tracks.

The front end unit 60 and the parameter estimator 70 are both coupled to a multi-user detector (MUD) stage 80 for processing of the signals. The MUD stage 80 consists of basic functional blocks of a preprocessor block 90, MUD block 100, one or more error correction decoding blocks 110 that process the digital data and extract the user signals. The format is typically one measurement per 'dimension' per symbol. The preprocessor 90 conditions the signals for improved processing, and in one embodiment comprises at least a filter bank 85 and a Cholesky factorization section 87. The multi-user detection stage 100 is detailed herein and cooperates with the error correction decoding (ECD) 110 for iterations of TurboMUD processing.

The output 120 of the iterative MUD stage 80 is returned for a number of iterations in conjunction with the parameter estimation unit 70 that uses the data from the MUD stage 80 for subsequent processing. When the output K bit stream 120 has reached a certain level of processing, the output signals 120 are forwarded to the output stage (not shown). The number of iterations can be fixed or based on a desired level of processing.

It should be readily appreciated that the reference to the iterative embodiment of Turbo-MUD is described herein while the non iterative MUD that runs a single cycle through the process is within the description.

In this communications embodiment, an input signal of raw non-manipulated data from the front end 60 is comprised of the aggregate of many signals from many different transmitters, where each signal is assigned a (frequency, timeslot, and/or spreading code) from a finite set of channels. This digital input signal or raw input data is then input to the parameter estimation unit 70 and the multiuser detector (MUD) stage 80. The MUD processing can employ the various state of the art schemes, including maximum likelihood (ML), minimum mean-squared error (MMSE), M-algorithm, T-algorithm, Fano-algorithm and other full or reduced-complexity approaches known to those in the art.

The parameter estimation unit 70 processes the various parameters from the received raw data, and provides certain data to the MUD stage 80. The parameter estimation unit 70 is known in the art, and a detailed description of one such estimation unit is published in patent application U.S. 2002/0037061 A1 entitled "System for Parameter Estimation and Tracking of Interfering Digitally Modulated Signals", which is commonly owned and incorporated by reference for all purposes.

In one embodiment, the MUD block 100 is a full-complexity MAP detector. Suboptimal reduced complexity MAP-based approaches are also known in the relevant art. The bit streams from the MUD block 100 are passed to a bank of error correction decoders 110. In the non-iterative MUD, the raw data is processed by an algorithm of the MUD 100 and the error correction decoders 110 outputs the data stream for each user either in soft or hard output. The iterative MUD or TurboMUD can be structured as a hard output or soft output processing, however in order to demonstrate a working embodiment, the soft output version is addressed herein, but it is well within the scope of the present invention to utilize hard outputs.

In a Turbo-MUD system, decoding and confidence information is passed between the MUD block 100 and decoder block 110. Maximum a posteriori (MAP) decoders (or approximations of MAP decoders) are well known to those in the art and are used for both the MUD and single-user (SU) decoders, so that soft output information is available if desired.

The MUD block 100 outputs a bit (or symbol) stream associated with each interfering signals present on the channel for one data block. Deinterleavers and interleavers (not shown) are optional elements coupled between the MUD block 100 and the decoders 110 that are used if the transmitted signals are interleaved, such as the CDMA format. The MUD block 100 generally passes soft decisions in the form of reliability, or confidence, measures to the decoders 110. The reliability measures are presented with one associated with each symbol of each user to the bank of decoders 110. If the signals were transmitted with interleaving, the reliability measures from the MUD block 100 are first passed through a deinterleaver (not shown) and passed on in shuffled form to the decoder 110. Shuffling refers to processing the same values but changes the placement or presentation of the values. The time-shuffled conditional probabilities are input back to the MUD block 100.

In one known variation, there is a bank of error correction decoders 110 that provide soft output values associated with prior probabilities. Viterbi decoders can be used, but these generally output hard values. Single user decoders calculate conditional probabilities, one for each decoded symbol of each user, and output them as confidence values back to the MUD block 100. Soft input soft output decoders, such as MAP or soft-output Viterbi algorithm (SOVA) decoders are examples known in the art.

For TurboMUD processing, soft outputs for each bit of each user from the bank of decoders 110 are fed back to the MUD block 100 for each iteration. The MUD block 100 takes these soft inputs along with the original raw input signal to calculate an improved, less corrupted bit stream for each user. This iterative process continues until the desired quality is reached or a fixed number is reached. At that point, estimates of the data sequences for all active users are output. Operation then commences for the next block of data, repeating the process described above.

The number of iterations for processing between the MUD block 100 and the decoders 110 can be set to a fixed counter or by checking if there were significant changes to the data from the last iteration. Once the data is no longer being altered or reaches a certain iteration counter limit, the data from the decoder 110 can be output 120 as final estimates of what the user sent. As stated, a fixed number of iterations can be stored and used for the processing by the decoder block 110. Alternatively, the information between the MUD block 100 and the decoders 110 can repeat in subsequent iterations until an asymptote is reached or the desired performance level is attained. A buffer can store the previous values and compare them to the latter processed values during the subsequent iterative process.

When processing is completed, the soft output of the bank of error decoders 110 is passed to a hard decision unit (not shown) which outputs the final stream of decisions or output data stream 120 for each interfering user for the current data block.

There are several MultiUser Detection schemes known in the art including, for example, those described in the commonly assigned published U.S. Patent Application 2003/0198305 titled Co-Channel Interference Receiver, which is incorporated herein by reference for all purposes.

The Preprocessor 90 can include a number of variations designed to improve the data processing, such as filtering and pre-whitening. In one embodiment the data to be processed by the MUD can be pre-whitened in a manner that partially decouples the users from multiple access interference, which improves performance. For example, in the case of Code Division Multiple Access (CDMA) communications schemes, the data stream is sampled by some multiple of the chip rate. For TDMA communication schemes, the data stream is sampled at some multiple of the symbol rate. The data from the front end 60 represents a vector of data, transferred at some rate (e.g., the symbol rate). This data is transmitted to preprocessor 90 which may include a filter bank 85 and a factorization unit such as Cholesky factorization 87. In addition, the same vector is passed on to the parameter estimation 70. The purpose of the parameter estimation module is to estimate timing, signal amplitudes, phases, polarization, and identification of transmission channels. Estimates of the parameters are passed to design the filter bank 85 and estimates of the parameters are also passed to design the corresponding whitener (not shown).

In a general sense, the process involves separating out the interfering signals, wherein the MUD processes the incoming signals on a time interval by time interval basis, and provides best guesses or estimates of the individual bits for each user. These best guesses or estimates are then applied in a feedback loop to the MUD so as to increase the likelihood that the particular bit is what it is supposed to be. This is done in an iterative process until such time as the error rate is statistically known to drop below a predetermined value. When it does, the bits corresponding to the digital incoming streams are output such that the incoming data is recovered with the interfering signals having been separated by the MUD.

The MUD processing steps can be expresses mathematically wherein Equation 1 is a linear model for processing the received samples:

$$r = SAb + n_w, \tag{1}$$

which defines the received samples in terms of the transmitted bits, b, and a model of the channel defined in S.

Symbol hypothesis testing can be done in several ways. One example is the maximum likelihood detector, which is expressed mathematically as:

$$\hat{b}_{ML} = \arg\min_b \|r - SAb\|^2. \tag{2}$$

The maximum likelihood detector is a brute force approach which requires an exhaustive search. The maximum likelihood solution consists of exhaustively evaluating the Euclidean distance between the received samples and the linear model of the samples using every possible hypothesis of the bit sequence. It is generally too computationally intensive for problems with a large number of users or severe intersymbol interference from multipath.

In more particular detail, the maximum likelihood solution is rewritten as:

$$\hat{b}_{ML} = \arg\min_b \left\{ (r - SAb)^H \Sigma^{-1} (r - SAb) \right\}, \tag{3}$$

where $\Sigma$ represents the covariance of the noise, $n_w$. When the noise is white, the weighted least squares solution in Equation 3 is identical to the maximum likelihood detector in Equation 2. For any matrix W the weighted least squares solution in Equation 1 is identical to the following solution:

$$\hat{b}_{ML} = \arg\min_b \left\{ (w - WSAb)^H \Sigma_W^{-1} (w - WSAb) \right\}, \tag{4}$$

where $w = Wr$ and $\Sigma_W = W\Sigma W^H$. The motivation of exploring linear combinations of the received data, is because certain transformations allow for more efficient searches of the more likely bit-hypotheses. The notation in Equations 3-4 is based on the linear matrix representation for samples of received waveform based on the presence of all users (see Equation 1).

Letting:

$$W = (A^H S^H SA)^{-1} A^H S^H, \tag{5}$$

then the filter bank defined by the matrix W is the filter bank used in the decorrelator receiver. The decorrelator receiver is attractive because it optimally mitigates the multiple access interference but does not account for the colored noise. Specifically, while the multiple access interference is eliminated, assuming known correlation matrix, the white noise component has been colored (when the signature waveforms are not orthonormal).

A more suitable filter bank includes the inverse of the square root of the correlation matrix. This combination results in a filter bank that partially decouples the multiple access interference yet maintains uncorrelated noise components. The cascade of the square root filter and the matched filter represents an orthonormal set of filters that are closest in a least squares sense to the signature waveforms. A square root filter bank defined using the Cholesky factorization of the correlation matrix is one of the more attractive square root factorizations. The correlation matrix is represented in Equation 5 by:

$$H = (A^H S^H SA). \tag{6}$$

The Cholesky factorization of the correlation matrix H is defined by:

$$H = (A^H S^H S A) = (F^H F), \quad (7)$$

where F is an upper-triangular matrix. Therefore the whitening filter is defined as $F^{-H}$ which is a lower triangular matrix. Therefore, rather than utilize decorrelating filter bank in Equation 5, the following partial decorrelating filter bank, defined as:

$$W = F^{-H} A^H S^H, \quad (8)$$

which is more suitable for efficient searches of the weighted least squares solution. The attraction of this particular square root factorization is illustrated by:

$$w = F^{-H} A^H S^H r = \quad (9)$$

$$Fb + z = \begin{bmatrix} F_{11} & F_{12} & F_{13} & F_{14} & \cdots & F_{1K} \\ 0 & F_{22} & F_{23} & F_{24} & \cdots & F_{2K} \\ 0 & 0 & F_{33} & F_{34} & \cdots & F_{3K} \\ 0 & 0 & 0 & F_{44} & \cdots & F_{4K} \\ \vdots & \vdots & \vdots & \vdots & \ddots & \vdots \\ 0 & 0 & 0 & 0 & \cdots & F_{KK} \end{bmatrix} \begin{bmatrix} b_1 \\ b_2 \\ b_3 \\ b_4 \\ \vdots \\ b_k \end{bmatrix} + \begin{bmatrix} z_1 \\ z_2 \\ z_3 \\ z_4 \\ \vdots \\ z_K \end{bmatrix}.$$

The partial decoupling of the co-channel interference is illustrated by the mean of the whitened output, w, defined to be Fb where F is an upper triangular matrix. Let the column vector, b, be ordered by user such that the top row represents the $1^{st}$ user and the bottom row represents the $K^{th}$ user. Computing the terms in Fb shows that the $K^{th}$ user is completely decoupled from all other user's bit hypotheses. Also the $(K-1)^{th}$ users bit hypothesis is only coupled with the bit hypothesis for user K. The term partial decoupling is used because the decisions for the (K-m) users are decoupled from any of the other users such that knowledge of the first 1 to (K-m-1) users are not required for making decisions on the later (K-m) users.

Continuing in this manner illustrates how measurements for any user have been decoupled from the actual bits of any "future" user. Note, the term "future" for user k refers to all users 1 through k-1.

The noise is whitened by using the partial decorrelator defined by:

$$W = F^{-H} A^H S^H. \quad (10)$$

The white noise is illustrated by:

$$F^{-H}(AS)^H E\{n_w n_w^H\}(AS)F^{-1} = \sigma_w^2 F^{-H}(AS)^H(AS) F^{-1} = \sigma_w^2 I, \quad (11)$$

where I represents the identity matrix and E represents the expectation of the random variables. The diagonal covariance matrix proves that noise has been whitened using the partially decorrelating filter bank defined in Equation 10. Substituting the decorrelating filter bank of Equation 10 into Equation 4 produces the same maximum likelihood solution.

The maximum likelihood expression in Equation 4 is rewritten in terms of the metric $\Omega(b)$ which is illustrated by:

$$\hat{b}_{ML} = \arg\min_b \Omega(b), \quad (12)$$

where, $$\Omega(b) = \sum_{k=1}^{K} \left| w_k - \sum_{j=k}^{K} F_{kj} b_j \right|^2. \quad (13)$$

Using Equation 12, the search for the optimal set of bits can be reformulated in terms of a decision tree in which the metric characterizing the likelihood of the bit hypothesis for user k, $b_k$, is now represented by the component:

$$\left| w_k - \sum_{j=k}^{K} F_{kj} b_j^2 \right|. \quad (14)$$

The term $b_k$ represents the bit hypothesis for user k and the term $w_k$ represents the filter bank output for filter k which has been matched to the signature waveform used by user k. The term $F_{jk}$ represents the Cholesky factor defined for users j and users k. The sequential nature of the ML metric is more clearly illustrated by the following expression. Each component of the summation (see Equation 14) can be considered as one of K stages of a decision tree. The following expression illustrates the first three terms of distance metric which would correspond to the components for the first three stages of the decision tree.

$$\Omega(b) = |w_K - F_{KK} b_K|^2 + |w_{(K-1)} - (F_{(K-1)(K-1)} b_{(K-1)} + F_{(K-1)K} b_K)|^2 + |w_{(K-2)} - (F_{(K-2)(K-2)} b_{(K-2)} + F_{(K-2)(K-1)} b_{(K-1)} + F_{(K-2)K} b_K)|^2 + \ldots \quad (15)$$

The individual metrics are evaluated at each node of the decision tree and the transition from the previous level to the current level of a decision tree consists of an accrual of the individual metrics along the path of the decision tree. Various suboptimal pruning techniques, such as the M-algorithm and T-algorithm, are available for efficiently traversing the decision tree with a tolerable error rate.

In one embodiment, the symbol hypothesis testing performed to efficiently investigate the more likely bit hypotheses for all K users. This is based on a sequential evaluation of the metric characterizing the likelihood of hypotheses. The metric corresponding to a particular user's bit hypothesis at a stage in the decision tree is detailed herein. The metric consists of the Euclidean distance between the output of one of the filters and the hypothesized mean signal energy based on the bit hypothesis for the user in question and the mean signal energy corresponding to the hypotheses selected for users previously tested. This mean signal energy is based on the Cholesky factorization of the diagonally loaded correlation matrix. The metric at each node of the decision tree includes the accumulation of metrics corresponding to previous decisions.

Unlike the decision feedback approaches, decisions are not immediately made. Various efficient decision tree search strategies can be employed for the symbol hypothesis testing. For example, the M-algorithm is one such approach that restricts the number of hypotheses at each stage to a fixed number. The T-algorithm is similar in nature to the M-algorithm although, it tends to restrict the number of hypotheses by comparing the accrued metric to a threshold. Variations of this approach and other efficient approaches to decision tree searches will be apparent in light of this disclosure.

In one embodiment the present invention is a system that uses a preprocessor of MUD that renumbers the users, which is the equivalent of swapping their position in the S-matrix, such that it improves the MUD processing. And, in one embodiment, the re-ordering is used with the M-algorithm.

Figure 2:
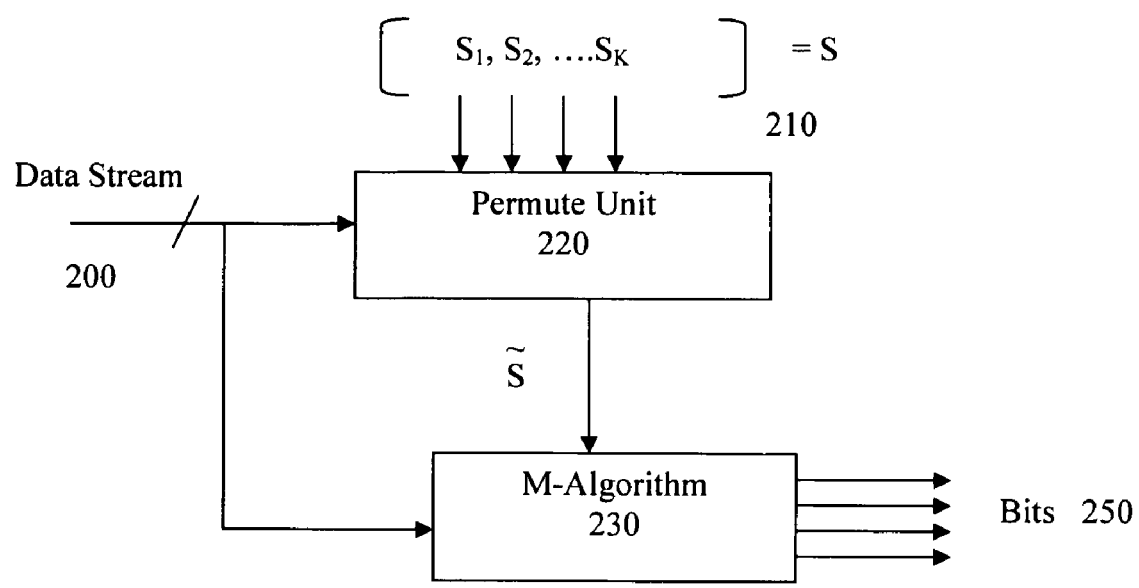
FIG. 2 is a block diagram of the approximate diagonalization system according to one embodiment of the present invention.
Figure 3:
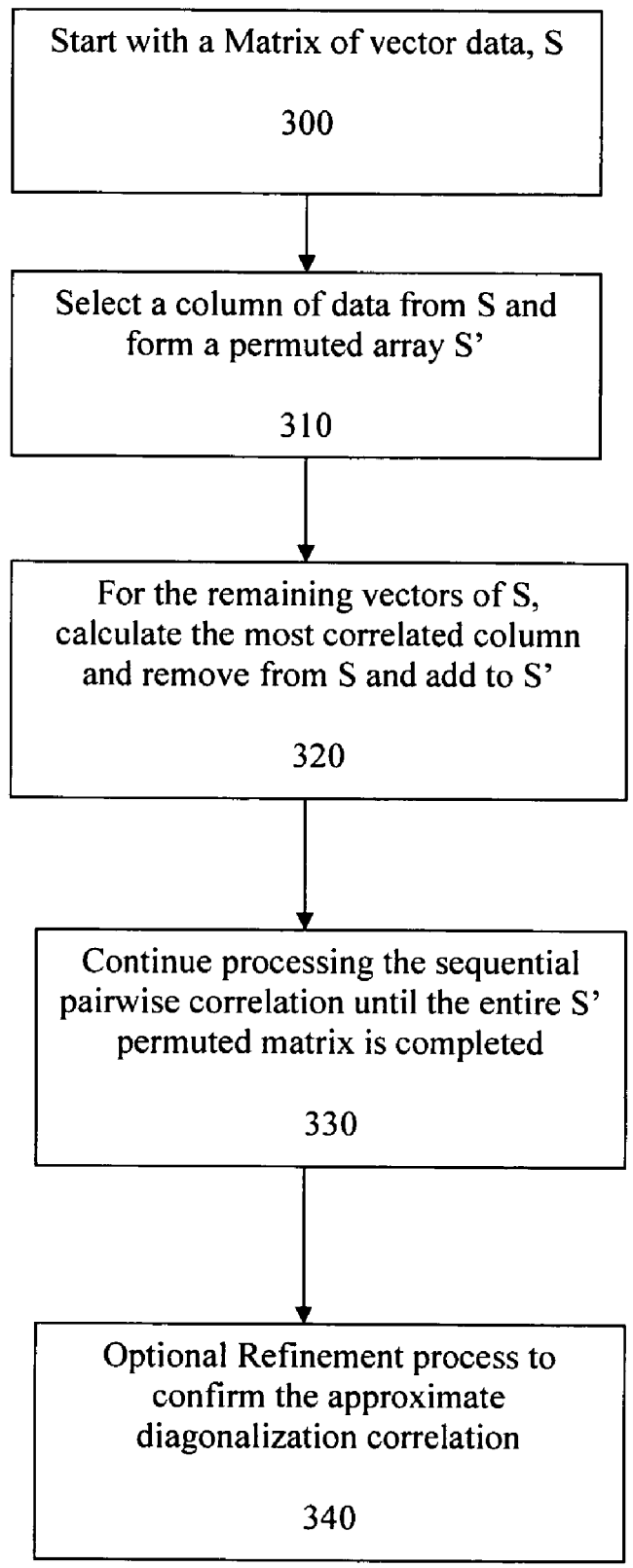
FIG. 3 is a flow chart illustrating the approximate diagonalization of a correlation metric according to one embodiment of the present invention.

Referring to FIG. 2, the input data stream 200, which represents any of the data types detailed herein is coupled to a permute unit 220 and an M-algorithm section 230. In this embodiment the data stream does not require any transformation prior to processing by the M-algorithm. The permute unit 220 is also coupled to the parameter estimator (not shown) and the resulting parameter estimator output which is an S-Matrix of vector data 210 for each user $S_1$-$S_K$. Unlike the prior implementations that manipulate transmissions, the present invention just takes the data stream 200 as it is presented in the data stream and reorders the users in the S-Matrix. It should be understood that the depiction of the M-algorithm is for illustrative purposes and other MUD algorithms can also be utilized herein with the present invention.

The permutation is a reordering of the columns within the S-Matrix and the output of the permute unit 220 is a modified S-Matrix that is input to the M-algorithm 230. After the iterative processing of the MUD, the output is a stream of bit decisions for each user from the input data stream 250.

One mathematical way to visualize the re-ordering of the present invention it through the correlation matrix. This refers to the permutated matrix wherein the ideal reordering would place the values in a diagonal. This processing appears similar in some respects to the Cholesky factorization, which is a more intensive and complex processing.

However, the present invention permutes the order of the users and performs the subsequent processing in a novel fashion. In one embodiment the present invention is an alternative front end low complexity system for accomplishing a satisfactory level of factorization.

In one embodiment the M-algorithm has a preprocessing element performing Cholesky factorization. The reordering of the present invention can operate in concert with the Cholesky factorization to improve the system processing. Thus, the reordering and the Cholesky factorization do not have to be mutually exclusive. Furthermore, the Cholesky factorization is just one example of various factorization implementations.

The reordering steps herein show mathematical processing according to one embodiment. The first step is to select a column of the S-matrix and assign this as the first one. The selection can be random or following a previously defined schema. The system then looks at all the rest of the columns and selects the next column that is the closest correlation. The processing continues with the sequential pairwise placement of columns next to each other based on correlation with the prior column. More specifically, the algorithm of the present invention can be expressed:

(a) Starting with "Qø" permutation of an S Matrix (300), i.e. $S_{start}=S*Q\phi$ i) select any column of S randomly, column 'm' ... initialize Qø with '1' in m'th row (310)

$$Q\phi = \begin{bmatrix} 0 \\ 0 \\ 0 \\ 1 \\ 0 \end{bmatrix} \quad \text{ii)}$$

iii) for m=2:end, select column of S correlating the most with previously selected column, append onto Qø a new vector of zeros, with a '1' in the position corresponding to this newly selected column of S (320)

$$Q\phi = \begin{bmatrix} Q\phi, 0 \\ 0 \\ 1 \\ 0 \\ 0 \end{bmatrix} \quad \text{iv)}$$

v) Sø=S*Qø is 1st permutation of S (330)

b) Optional Refinement—Now for iii=1:n iterations, check if swapping any 2 columns of Qø makes the correlation "more diagonal", for example Check $(S*Q)^H(S*Q)$ more diagonal than $(S*Q\phi)^H(S*Q\phi)$; If so replace Qø with Q, and continue processing. (340)

The present invention solves the problem that joint bit decisions when bits are separated in the decision tree. Analytic "best permutation" algorithms also can be used as known in the art.

An example of the processing is depicted as follows. Commencing with an S-Matrix of input vector data for K users: $S=[S_1, S_2, \ldots S_K]$, select one column at random, for example, the vector data of column S3 and form the permutated modified S-Matrix S'=S[3]. Remove this column from the original S-Matrix such that the remaining S-Matrix, $S_R=[S_1, S_2, S_4, \ldots S_K]$. Next, for the remaining vector data in $S_R$, compute $S_3{}^H S_1\ S_3{}^H S_2\ S_3{}^H S_4\ \ldots\ S_3{}^H S_K$ and select the largest magnitude value which translates to the most correlated to $S_3$.

Assume $S_{27}$ is the most correlated (biggest value), thus the permuted S-Matrix S'=$[S_3, S_{27}]$. The column $S_{27}$ is removed from the remaining vector data of the S-Matrix, $S_R=[S_1, S_2, S_4, \ldots S_{26}, S_{28}, \ldots S_K]$. The processing continues with computing the next, for the remaining vector data in $S_R$, compute $S_3{}^H S_1\ S_3{}^H S_2\ S_3{}^H S_4\ \ldots\ S_3{}^H S_{26}\ S_3{}^H S_{28}, \ldots S_3{}^H S_K$ and select the largest magnitude value which translates to the most correlated to $S_{27}$. The processing continues by sequentially placing the most correlated value next to the previously selected correlated value.

Once completed, the approximate diagonalization of the permuted matrix S' is a normalized matrix with 1's running diagonally across the matrix wherein off diagonal values are the correlation of two vectors next to each other. The off diagonals are all correlations of pairs of vectors in S' that are next to each other. And, because in the new ordering of the paired values from the permutation, certain values are forced next to each other such that the pairwise association gets closer to the diagonalized matrix. For example, $S_3$ and $S_{27}$ are forced next to each other from the reordering and the pairwise association achieves the approximate diagonalized matrix. Included herein is a representative matrix for a permuted S' Matrix. By way of illustration, the first entry on the first super-diagonal would be $c_{12}=S'_1{}^H S'_2=S_3{}^H S_{27}$, the second entry $c_{23}=S'_2{}^H S'_3$, and so forth.

$$S'^H S' \begin{pmatrix} 1 & c_{12} & & & \\ & 1 & c_{23} & & \\ & & \ddots & \ddots & \\ & & & 1 & c_{n-1,n} \\ & & & & 1 \end{pmatrix}$$

While the described example is a pairwise sequential correlation, other embodiment are within the scope of the invention such as selecting from the remaining vectors that which correlates to more than one of the previously selected vectors. For example, the selection of the next vector after $S_{27}$ may be correlated to $S_3$ and $S_{27}$, and the sum power of the correlations used as a metric.

According to one embodiment of the present invention, the system reorders the entries in the S-Matrix in order to move the bit decisions closer together in the decision tree. One embodiment is an optional subsequent refinement analysis of the pairwise columns for proper correlation. This refinement takes additional time but confirms the reordering selection of the columns and the validity of the correlation.

Those skilled in the art will also appreciate that many MUD demodulators require an implementation of MUD, which may be computationally expensive and time consuming. For example, in larger MUD applications with a very large S-Matrix, a windowed approach can sometimes be used to divide the S-Matrix into small S-Matrix sections. This generally requires some re-ordering in order to ensure that the segments contain the required data range. Other schemes that can re-order the entire S-Matrix, such as the Cholesky factorization, in order to establish the proper order for the windowed MUD processing is time and hardware intensive. The present invention provides an approximate diagonalization that can re-order the entire matrix thereby allowing the windowed MUD processing to function without having to undergo more intensive processing.

Another type of ordering is described herein which reflects a further refinement of commonly assigned U.S. Pat. No. 6,704,376, the contents of which is incorporated herein by reference. The present systems disclose a real-time multi-user detection (MUD) receiver processing simultaneous digitally modulated interferes and transmissions in the same frequency optimizing performance for heavily loaded and overloaded multiple access system by implementing an iterative Turbo MUD receiver using tree-pruning, including confidence ordering, power-ordering, and a voting procedure. On the first iteration, user's indices are ordered according to received powers. On subsequent iterations, the voting system provides soft decisions or confidence values utilized as soft inputs to single-user decoder. Voting is computationally attractive and allows the bank of decoders to operate on soft values, improving performance and reducing the number of turbo MUD iterations. The bank of soft output error correction decoders produces an improved set of soft decisions or confidence values corresponding to the channel bits transmitted by each interfering user. Confidence values from the bank of decoders are used to order user indices, allowing the tree pruned MUD detector to operate on the most reliable symbols first, improving the likelihood that pruning is correct. Subsequent confidence ordering and estimate refinement occurs until conditions are satisfied and iterative processing completed.

The decision metrics computed in the existing systems utilize only part of the available information in the M-algorithm and generally compute the metrics only at the end of the decision making process. Thus, an embodiment of the present invention is a system and method to evaluate the performance of an M-algorithm for individual channels of demodulated bits, when hard outputs only are typically available. More particularly, the present invention provides a means for derivation of soft decision information from a hard decision tree. According to one embodiment, linear transformation of decision states at optimal branching points is accomplished utilizing path metrics.

As known in the art, prior art TurboMUD suffers from limitations with respect to real-time processing of data in a multi-user environment due to the complexity of processing a large number of possibilities in the tree.

Figure 4:
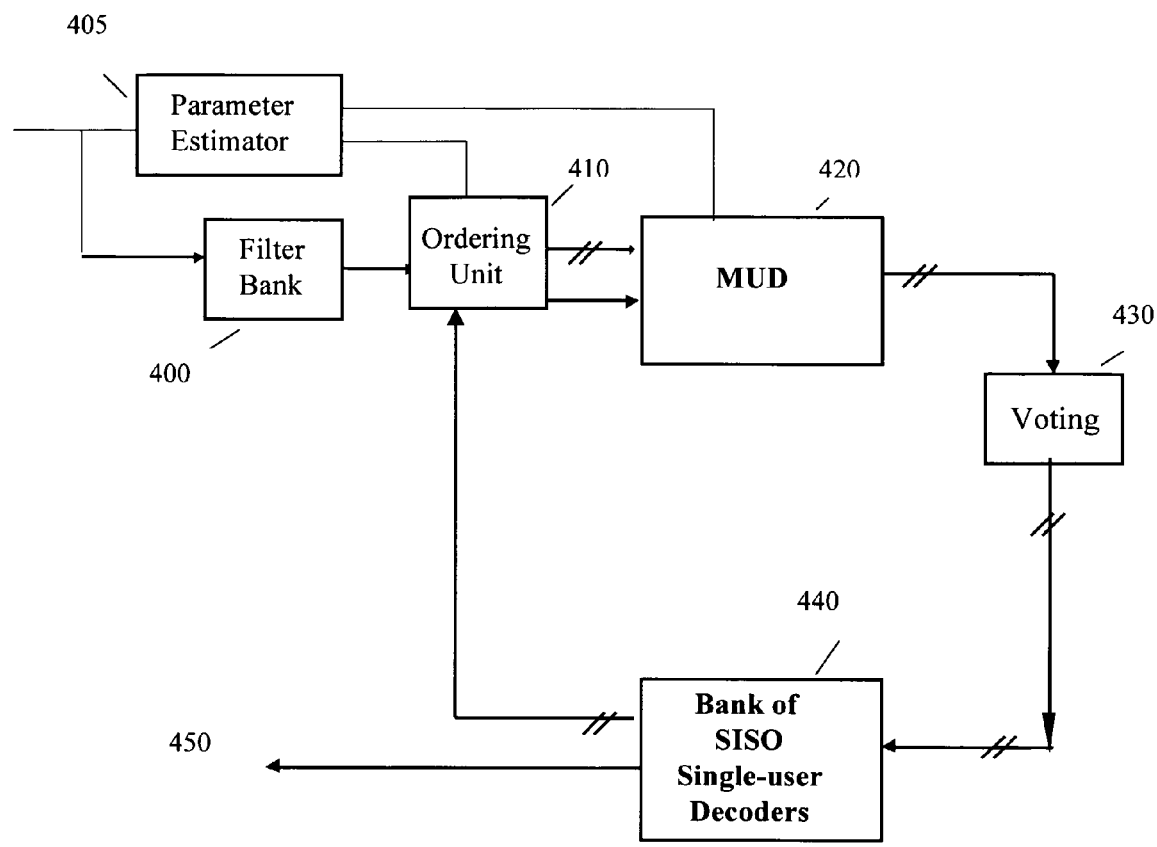
FIG. 4 is a perspective view of the MUD system configured in accordance with one embodiment of the invention.

FIG. 4 depicts a voting embodiment. This particular embodiment encompasses a data-whitening front end filter bank 400, an ordering unit 410 that re-orders users on a per-symbol basis based on received signal power in the first iteration and confidence in subsequent iterations, any tree-pruned MUD 420, a voting soft-metric production unit 430 that examines the bit estimates in the surviving sequences determined in the MUD 420 and produces a soft reliability values, and a bank of soft-input, soft-output single user (SU) decoders 440. The components are connected in a turbo configuration, and it is assumed that interleaving and de-interleaving are not present. The extension to a system with interleaving is an obvious variation by adding a deinterleaver after the MUD 420 and an interleaver after the Decoders 440.

The received measurement vector representing the received downconverted sample signal is passed through a data whitening filter bank 400 and also to the parameter estimation unit 405. The optional filter 400 can either be a filter designed for an overloaded system to pre-process a signal comprised of more transmissions than orthogonal channels, or a whitening filter that is appropriate for fully loaded or underloaded systems. The filtered signal is then passed to the MUD 420.

In one embodiment, for each symbol interval in the first iteration, the ordering unit 410 re-assigns the user indices according to decreasing received signal strength. The tree-pruned MUD 420 builds a decision tree starting with user 1, the user 2, all the way up to user K. The ordering unit decides which user should be user 1, which should be user 2, and so on. The ordering on the first iteration establishes an initial ranking according to the greatest signal strength for that group of signals.

The parameter estimation unit estimates and tracks the signal strength or power of each individual signal as well as various other signal parameters for each of the transmitted signals, such as carrier phase, carrier offset, clock, etc. This power information is forwarded to the ordering unit 410, which re-orders the signal indices and forwards the re-ordered parameter data 470 to the tree pruned multi-user detector unit 420.

Figure 5:
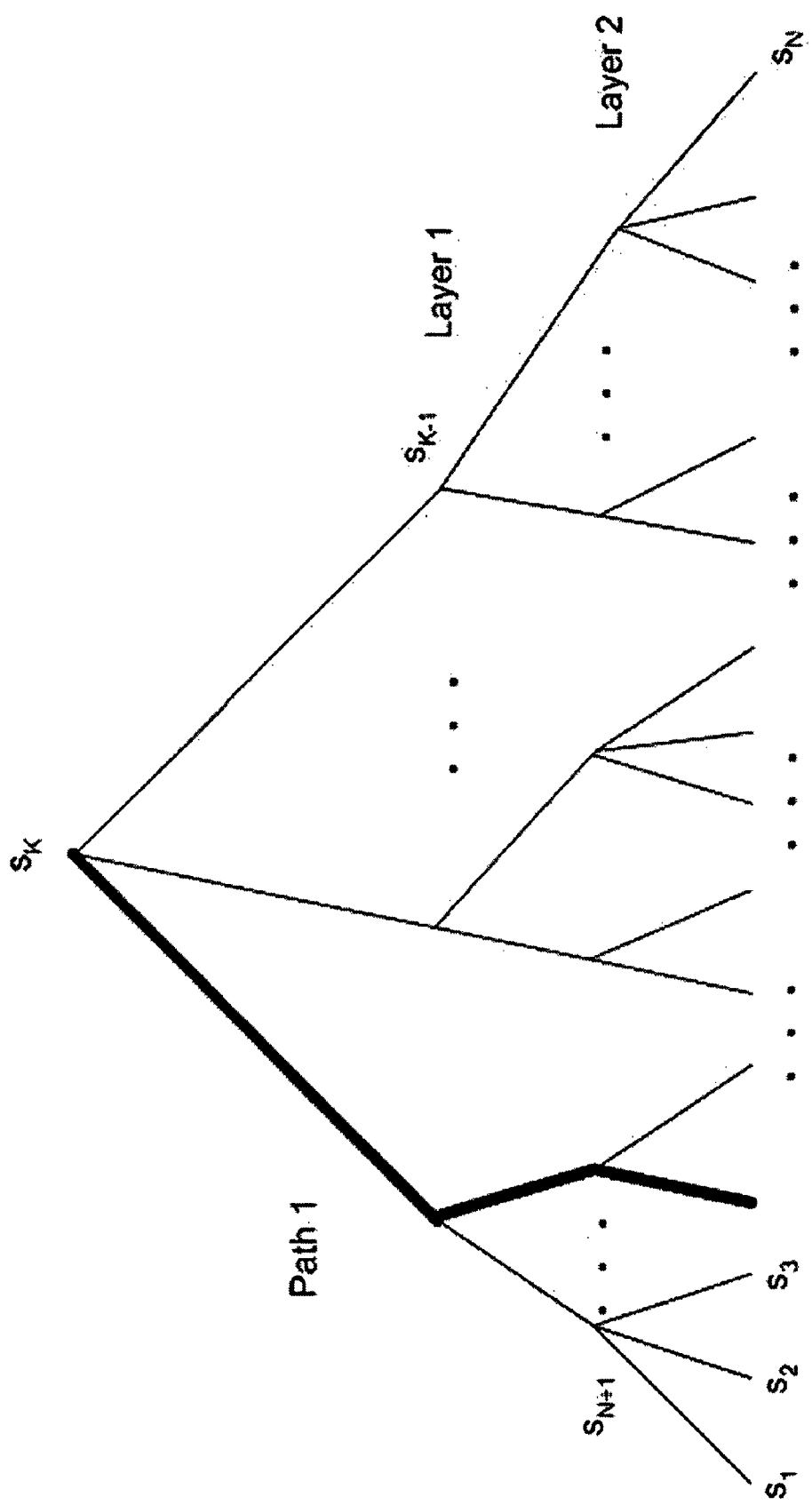
FIG. 5 is an illustration of a decision tree showing layers and branches in accordance with one embodiment of the invention.

Referring to FIG. 5, the decision tree is typically constructed by placing the highest power user-related nodes in the first level of the tree nearest the tree root, the second-highest-power user-related nodes in the second level of the tree, etc. By building the decision tree with the highest power signal first, directly corresponding to calculating the decision metric term by term, the first term contains measurements and information relating to the highest power user. A reduced search of a decision tree built in this manner is more likely to include paths (and nodes) that contain the 'correct' answer.

In other words, due to the advantageous power ordering in the decoding tree, the low complexity suboptimal search of the tree will be more likely to include the branches containing the correct answer, thus ultimately resulting in the correct answer more often than when power ordering is not used. However, the present invention is not limited to a power ordering scenario.

For each symbol interval in subsequent iterations after the ordering, ordering unit 410 examines the conditional probabilities (reliability values) calculated by the single-user detectors 440 and orders the users in decreasing values of likelihood of correct detection. In effect, the users are renumbered so that, for each symbol interval, the MUD detector 420 can operate on the symbol for the most reliable user for that interval, first, improving the likelihood that the pruning is correct.

The ordering information may change from symbol interval to symbol interval within the block of data under consideration. The re-ordered user indices and corresponding confidence measures 470 are passed to the MUD 420 along with the vector of whitened signals from the received signal 470. The MUD 420 may contain any tree-pruned MUD, such as the M-algorithm based approach or a pruned tree based on MAPMUD. The system 'remembers' past output bit values in the event that the MUD determines that the ordering was incorrect and the processing has to return to a known state.

The MUD 420 passes the surviving symbol combination possibilities (M survivors for M algorithm, for instance, or several most likely, for other approaches) to the voting section 430.

MUD detector 420 passes the surviving symbol combination possibilities in terms of M survivors to the voting unit 430. The voting procedure may be applied to synchronous or asynchronous systems, but for simplicity, only the synchronous case is described. For each symbol interval, MUD 420 determines the likelihood of some number of symbol combinations from the users, one from each user. For example, the MAP and ML MUD determine the likelihood of $2^{(\# \ of \ users)}$ combinations. The M-algorithm-based approaches then calculate the likelihood of M combinations. Each of the M combinations represents a best guess as to what a bit is for each user, e.g. each of the M surviving paths corresponds to one possible solution that determines one bit value for each interfering transmission.

Thus, for the symbol interval, each survivor of MUD unit 420 contains a symbol estimate for every user, +1/−1 for BPSK, for instance. The voting procedure is then done for each symbol interval, i.e. each bit. For each user, the estimate from every survivor for that user is examined and included in a vote. In the '376 patent, the bit decisions of the paths were primarily averaged. Rather than doing an average, the present invention does a weighted average and puts more weight in the average to the better paths. The process is done for each user and all symbol intervals and provides K streams of reliability measures or soft estimates of the symbols, one stream of soft symbol decisions for each user is passed in time-ordered form to a bank of single-user decoders 440. Single user decoders 420 use the information as a priori information and output conditional probabilities that are then fed back to the ordering unit 410. If the MUD is based upon the MAP-MUD, then these conditional probabilities are also passed to the MUD 420.

In operation, rather than requiring the multi-user detector to provide the soft outputs and thereby increase the computational complexity and processing time, hard outputs from the multi-user detector are tolerated by converting these hard outputs into soft outputs through the voting algorithm. In one embodiment the voting algorithm analyzes, for each user, the various guesses from the multi-user detector as to what the particular bit is, either +1 or −1.

It is understood that the output of the multi-user detector is a series of best guesses as to what the particular decoded bit should be. These guesses are the result of the application of various assumptions in the multi-user detection algorithm based upon prior expected knowledge of the signals. The voting algorithm of the present invention for each user uses a weighted average of the results of a predetermined number of best guesses (for instance, M best guesses for an M-algorithm implementation) and provides that average as a real number.

The basic algorithm of the invention is a soft output from hard decision M-algorithm as may be seen from the bit decisions made in the last surviving M branches as follows:

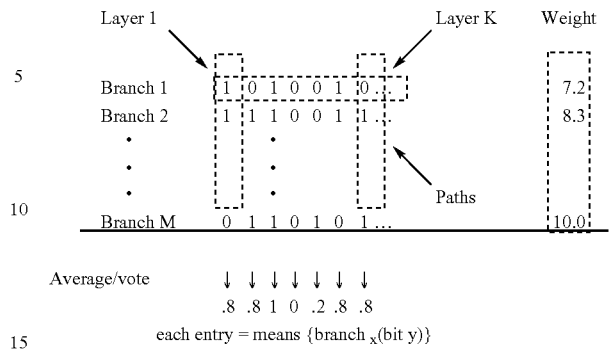

In a first embodiment of the present invention, the processing gets the soft-output "average" for each bit not at the end of the tree, but at an intermediate stage where more branches associated with that decision all active. As noted in FIG. 5, if you were only going to keep only a limited number of paths in each layer, at lower levels, non-used paths are generally discarded. Metrics are already calculated prior to discarding, so one embodiment of the present invention is to use the weighted averaging on the potentially discarded paths prior to discarding. Rather than waiting till the end, do the weighting at every layer and as there are more active paths.

In another embodiment, rather than doing averaging or voting of M branches at each decision, a weighted average is done where the decisions are weighted by the (normalized) branch metrics.

Referring again to the binary tree in FIG. 5, in the M algorithm, the decision tree structure has a number of branches wherein each 'layer' corresponds to a bit decision that you are trying to make.

Paths represent the survived decisions and has some bit metric associated with it, which is a computation of how well the sequence of bits along that path conformed to the data. The Weighted average can be presented in many forms, however for illustrative purposes, one weighted average is as follows:

$$Softbits = \sum_{i=1}^{M} (branchi) * Wi \div \sum_{i=1}^{M} Wi$$

Using a weighted average allows the system to add more value to a particular path. For illustrative purposes, the present invention will be shown to key on the Euclidean distance between the computed signal along a decision path and the actual received signal.

For example, if "B" is the M by N matrix of bit decisions, each row of which corresponds to the bit decisions along a surviving path m, such that $$\frac{1^T}{m}$$

B is the voting algorithm. One embodiment of the present invention employs an alternative rule $w^T \cdot B$ where 'w' is a metric collected in a vector of length m, possibly non-linearly transformed, but normalized such that $w^T \cdot 1 = 1$.

One way of computing the weight is by examining the signal energy: $E_r - // r-r'//^2/E_r$; And by: $1-(//Error//^2) / (//r//^2)$ There are many ways to process a weight.

Those skilled in the art will readily appreciate that a novel linear approximation of posterior likelihood, using the M-algorithm is disclosed. It will be understood that this disclosure describes how to also include likelihood data in the computation of the soft decision values, producing more accurate estimates of the true values, at only minimal increase in computational complexity. These computations are also performed at the optimal times, when the highest number of active branches is available for the decision at hand.

It will also be understood that many MUD demodulators require an implementation of the M-algorithm, which cannot without modification be used in a Turbo-MUD. This invention facilitates the use of an M-algorithm in a turbo-MUD.

Embodiments of the invention may be implemented in software, hardware, firmware, or any combination thereof. For instance, the parameter estimation and MUD modules may be implemented in a set of instructions executing on a digital signal processor or other suitable processing environment. Alternatively, the modules can be implemented in purpose built silicon (e.g., ASIC, FPGA, or other system-on-a chip designs).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for reordering users in a multiuser detector (MUD), comprising:
    processing an incoming data stream in a parameter estimator to form an initial S-Matrix of K users;
    re-ordering said initial S-Matrix in a MUD ordering unit starting from a random initial column, wherein said re-ordering includes selecting, in a permute unit, said random initial column; removing in said permute unit, said random initial column from said initial S-Matrix of K users thereby forming a remaining S-Matrix array;
    forming in said permute unit, said permuted S-Matrix array starting with said random initial column, wherein said forming includes;
    from said remaining S-Matrix array, correlating in said permute unit, a sequential column;
    removing in said permute unit, said sequential column from said remaining S-Matrix array;
    adding in said permute unit, said sequential column to said permuted S-Matrix array; and
    repeating said correlating, removing and adding in said permute unit, for said remaining S-Matrix array thereby performing approximate diagonalization in said multiuser detector; and
    using said permuted S-Matrix Array in said multiuser detector and outputting an array of bit decisions to an output stage.

2. The method of claim 1, wherein said permuted S-Matrix array is a sequential pairwise correlation from each of a previous correlated column.

3. The method of claim 1, wherein said multiuser detector is an M-algorithm.

4. The method of claim 1, further comprising performing Cholesky factorization of said initial S-Matrix.

5. The method of claim 1, further comprising a refinement of said permuted S-Matrix array to confirm correlation.

6. The method of claim 1, wherein said permuted S-Matrix array is processed in a windowed multiuser detector.

7. The method of claim 6, wherein said S-Matrix is reordered prior to being processed in said windowed multiuser detector.

8. A multiuser detection method in a multiuser detector (MUD) device for performing approximate diagonalization of an S-Matrix of vector data arranged in a plurality of columns, comprising:
    selecting in a permute unit, an initial column of data from said S-Matrix array;
    removing in said permute unit, said initial column of data from said S-Matrix array thereby forming a remaining S-Matrix array;
    forming in said permute unit, a permuted S-Matrix array starting with said initial column of data, wherein said forming comprises;
    from said remaining S-Matrix array, correlating in said permute unit, a sequential column;
    removing in said permute unit, said sequential column from said remaining S-Matrix array;
    adding in said permute unit, said sequential column to said permuted S-Matrix array; and
    repeating said correlating, removing and adding in said permute unit, for said remaining S-Matrix array thereby performing said approximate diagonalization in said multiuser detector device.

9. The method of claim 8, wherein said initial column of data is a randomly selected column of data.

10. The method of claim 8, wherein said correlating is a pairwise correlation to said sequential column.

11. The method of claim 8, further comprising forming said S-Matrix Array from a subsection of a larger S-Matrix Array.

12. The method of claim 11, further comprising re-ordering said larger S-Matrix Array prior to forming said S-Matrix Array.

13. The method of claim 8, further comprising confirming said approximate diagonalization of the permuted S-Matrix array.

14. The method of claim 13, wherein said confirming comprises swapping each of said columns of data from said permuted S-Matrix array, determining if correlation is improved by said swapping, and replacing any said columns that provide improved correlation.

15. An advanced receiver apparatus for processing multiple received signals with interfering signals, comprising: an ordering unit for ordering users indices;
    a multi-user detector coupled to said ordering unit producing a plurality of surviving states;
    wherein said multiuser detector includes a permute unit producing a remaining S-Matrix array and a permuted S-Matrix array from an initial S-Matrix array, said remaining S-Matrix array is formed from permuting said initial S-Matrix array by selecting and removing, in said permute unit, a random initial column, said random initial column from said initial S-Matrix array, forming said remaining S-Matrix array; furthermore forming in said permute unit, said permuted S-Matrix array starting with said random initial column, wherein said forming includes; from said remaining S-Matrix array, correlating in said permute unit, a sequential column; removing in said permute unit, said sequential column from said remaining S-Matrix array; adding in said permute unit, said sequential column to said permuted S-Matrix array; and repeating said correlating, removing and adding in said permute unit, for said remaining S-Matrix array thereby performing approximate diagonalization in said multiuser detector;

a voting unit coupled to said multi-user detector for processing said surviving states and generating a set of soft estimates of channel symbols, wherein said surviving states are calculated by using a weighted average comprising at least one of: least squares weighting, weighting by path quality, weighting based on results of a predetermined number of best guesses, and weighting by normalized branch metrics; and a decoder section coupled to said voting unit and said multi-user detector, wherein said decoder section processes said soft estimates of channel symbols to produce a final output on a final iteration, and wherein said decoder produces confidence values for intermediate iterations.

16. The receiver of claim 15, wherein said weighted average includes a plurality of partially discarded paths.

17. The receiver of claim 15, wherein said weighted average is a calculation of the Euclidean distance between a computed signal along a decision path and the actual received signal.

18. The receiver of claim 15, wherein said multi-user detector is an M-algorithm.

19. The receiver of claim 15, wherein said user ordering is a pairwise correlation.

20. The receiver of claim 19, wherein said user ordering combines said pairwise correlation with a power ordering.

* * * * *